Jan. 14, 1969  R. A. PARACHEK  3,421,265
APPARATUS FOR HOLDING CHAIN
Filed March 22, 1965
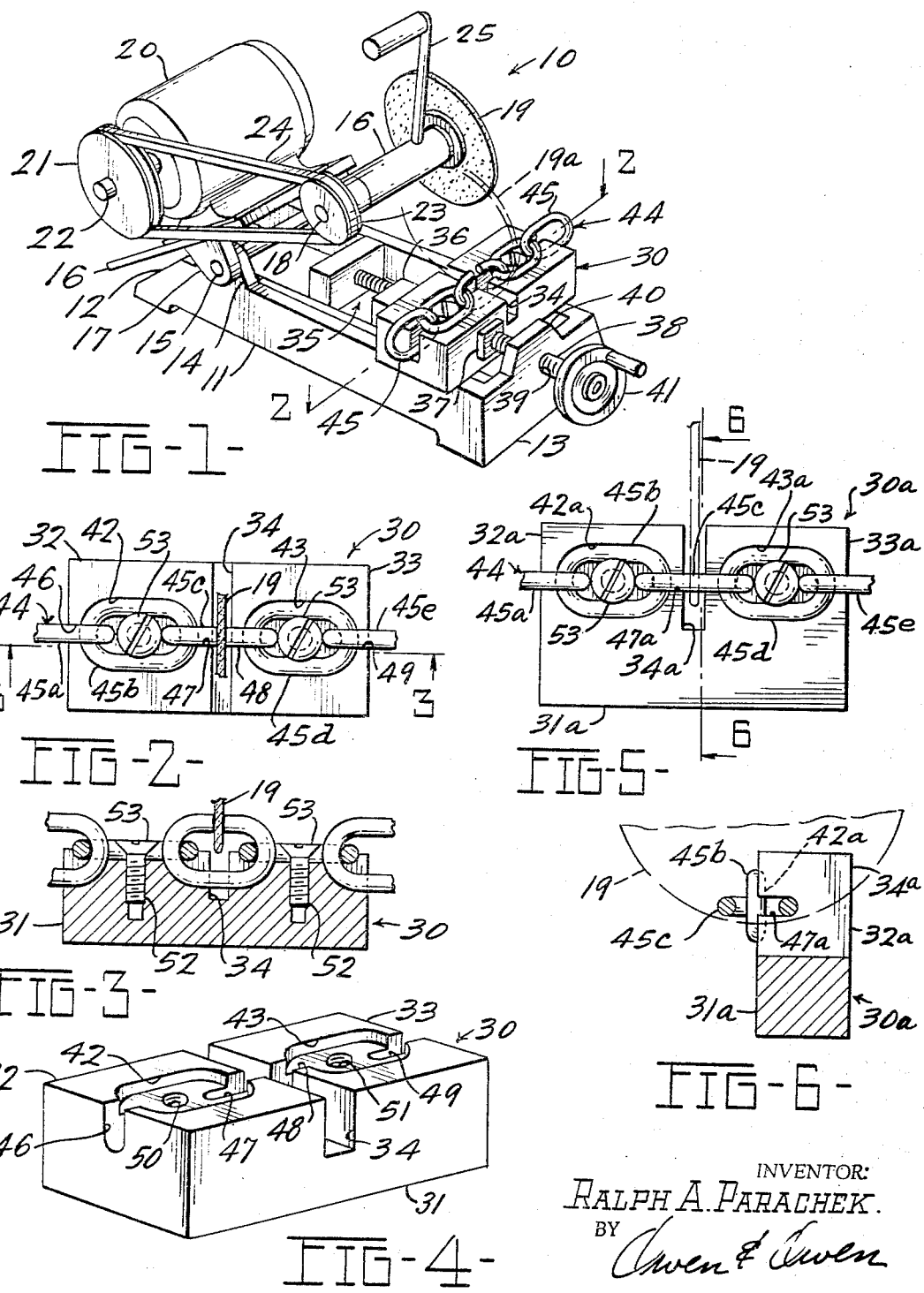
INVENTOR:
RALPH A. PARACHEK.
BY
Owen & Owen
ATT'YS.

United States Patent Office 3,421,265
Patented Jan. 14, 1969

3,421,265
APPARATUS FOR HOLDING CHAIN
Ralph A. Parachek, Toledo, Ohio, assignor to Mill & Factory Supply Company, Toledo, Ohio, a corporation of Ohio
Filed Mar. 22, 1965, Ser. No. 441,567
U.S. Cl. 51—98                6 Claims
Int. Cl. B24b 7/00

ABSTRACT OF THE DISCLOSURE

A jig for holding a chain while cutting a chain link. The jig has a base with two stationary, opposed end portions spaced to receive a cutting wheel. Each of the end portions defines in its outer surface at least one chain link receiving recess. When the links of a chain are positioned in the link receiving recess, the chain link to be cut is held in a position normal to the plane of the cutting wheel.

---

This invention relates to an apparatus for holding chain, and, more particularly, to a chain jig to be used in combination with a chain cutting machine.

Over the years the quality of alloy chain has been improved in many respects. However, the improved tensile strength and wear resistance of alloy chain has created a problem in the cutting of the chain.

One prior art method of cutting alloy chain involves using a bench grinder which has a high speed rating, for example, 3,500 r.p.m. An abrasive, reinforced, cut-off wheel, for example an abrasive cut-off wheel is mounted on the bench grinder. The operator grasps the chain to be cut with one or two Vise Grip pliers, depending on the size of the chain. He then engages the chain with the cut-off wheel and holds the chain link against the wheel until the cut is completed. This method of cutting chain is unsatisfactory because of the safety hazard involved. The success of cutting chain, by this prior art method, is largely dependent upon the skill of the individual worker.

It is the primary object of the instant invention to provide improved holding apparatus for use during the cutting of chain, particularly high alloy chain.

It is another object of the instant invention to provide an improved chain jig, for use in cutting chain, which insures consistent and accurate cutting of a chain link.

It is a further object of the instant invention to provide apparatus for cutting chain which is safe and may be used by an inexperienced worker.

Further objects of this invention will become apparent from the following specification and drawings in which:

FIG. 1 is a perspective view of chain cutting apparatus, according to the instant invention, including a novel chain jig and showing a chain positioned within the chain jig;

FIG. 2 is a top plan view, taken along the line 2—2 of FIG. 1 and showing in particular the chain jig and the chain positioned therein;

FIG. 3 is a vertical sectional view taken along the line 3—3 of FIG. 2;

FIG. 4 is a perspective view showing the chain jig, according to the instant invention;

FIG. 5 is a side elevational view of another embodiment of the chain jig, according to the instant invention; and FIG. 6 is a vertical sectional view taken along the line 6—6 of FIG. 5 and indicating a cut-off wheel by dashed lines.

Briefly, the invention relates to apparatus for cutting chain and particularly to a novel chain jig for holding the chain during a cutting operation. An arm is pivotally mounted on a base and a cutting wheel is rotatably mounted on the arm. Motor means are provided for rotating the cutting wheel in a predetermined plane which is normal to the plane of the base. A chain jig is positioned on the base adjacent the cutting wheel and clamping means secure the chain jig in a predetermined position on the base. The chain jig comprises a body having a bottom portion and opposed end portions which extend upwardly from the bottom portion. The end portions are spaced apart and define therebetween a receiving slot which extends transversely of the bottom portion in the predetermined plane of the cutting wheel. Each of the end portions defines in its outer surface at least one chain link receiving recess. When the links of a chain are positioned in the link receiving recesses the chain link to be cut is held in a position normal to the predetermined plane of the cutting wheel.

Referring to FIG. 1 of the drawings, a chain cutting apparatus, according to the instant invention, is generally indicated at 10. The cutting apparatus 10 comprises a longitudinally extending base 11 having a rear end 12 and a front end 13. The rear end 12 has a pair of upstanding bearing projections 14 which mount a pivot shaft 15.

An arm 16, having downwardly extending ears 17, is pivotally mounted on the shaft 15. One end of the arm 16 rotatably journals an arbor 18 which in turn mounts a grinding or cutting wheel 19. The cutting wheel 19 is mounted in a predetermined plane which is normal to the plane of the base 11. Another position of the cutting wheel 19 is indicated by dashed lines 19a.

A motor 20 is mounted on the rear end of the arm 16 and a drive pulley 21 is mounted on a motor shaft 22. Another pulley 23 is mounted on the arbor 18 and a belt 24 extends between the pulleys 22 and 23. An L-shaped handle 25 is fixed to the front end of the arm 16.

A chain jig, according to the instant invention, is generally indicated by the reference numeral 30 (see FIGS. 1 and 4). In this embodiment, the chain jig 30 has a rectangular bottom portion 31 and opposed end portions 32 and 33 which extend upwardly from the bottom portion. The opposed end portions 32 and 33 are spaced apart horizontally and define therebetween a receiving slot 34 which extends transversely of the bottom portion 31 of the chain jig 30.

The chain jig 30 is placed upon the base 11 in a predetermined position wherein the longitudinal centerline of the receiving slot 34 falls within the predetermined plane of the cutting wheel 19. Preferably, the receiving slot 34 is only slightly wider than the width of the cutting wheel 19. When the cutting wheel 19 is lowered to the position 19a (see FIG. 1) the cutting wheel 19 extends downwardly into the slot 34 without contacting the end portions 32 and 33 of the chain jig 30.

The chain jig 30 is held in its predetermined position on the base 11 by a clamp generally indicated at 35. In the present embodiment, the clamp 35 comprises a fixed block 36 and a movable block 37. The movable block 37 is mounted on the end of a threaded shaft 38 which extends through a threaded opening 39 of an end projection 40 of the base 11. A hand wheel 41 is mounted on the other end of the shaft 38. Rotation of the hand wheel 41 moves the block 37 into and out of engagement with the chain jig 30.

Referring to FIG. 4, in this embodiment the end portion 32 of the chain jig 30 has a chain link receiving recess 42 in its top surface and similarly the end portion 33 has a chain link receiving recess 43 in its top surface. The chain link receiving recesses 42 and 43 are longitudinally aligned and their longitudinal centerline is normal to the predetermined plane of the cutting wheel 19. Referring to FIG. 1, a chain to be cut, for example a chain 44 having a plurality of interconnected links 45, is inserted in the chain jig 30. The chain link receiving recesses 42 and 43 (FIG.

4) are slightly larger than the outer periphery of the links 45 of the chain 44, therefore the chain links 45 fit snugly into the respective link receiving recesses 42 and 43. Preferably, the link receiving recesses 42 and 43 extend downwardly from the top surfaces of the respective end portions 32 and 33 a distance greater than one-half the diameter of the bar diameter of the chain 44.

Downwardly extending link grooves 46 and 47 are provided in the end portion 32 of the chain jig 30 along the longitudinal centerline and at opposed ends of the chain link receiving recess 42. Similarly, link grooves 48 and 49 extend downwardly into the end portion 33 of the chain jig 30 adjacent the opposed ends of the chain link receiving recess 43. The link grooves 46 and 47 both communicate with the chain link receiving recess 42 and extend outwardly through the sidewalls of the end portion 32. Similarly, the link grooves 48 and 49 communicate with the chain link receiving recess 43 and extend outwardly through the sidewalls of the end portion 34.

Referring to FIG. 2, when the chain 44 is positioned within the chain jig 30 a first chain link 45a is received by the link groove 46. An adjacent chain link 45b fits snugly into the chain link receiving recess 42 and the next chain link 45c, which is the link being cut, is received by adjacent link grooves 47 and 48. Similarly, links 45b and 45e are received by the chain link receiving recess 43 and the link groove 49, respectively.

Preferably, threaded holes 50 and 51 are provided in the end portions 32 and 33 at the center of the receiving recesses 42 and 43. When the chain 44 is positioned in the chain jig 30, set screws 52 having flaring heads 53 are inserted in the holes 50 and 51 to restrain or hold the chain 44 in its proper position during the cutting operation. The flaring heads 53 engage the links 45b and 45d to prevent relative vertical movement between the links and the chain jig 30. It has been found that the set screws 52 are not necessary in a normal cutting operation, however, when used they serve as holding means wherein the chain jig 30 can be rotated without having the chain 44 fall from its position within the chain jig.

In a typical cutting operation, after the chain 44 has been positioned in the chain jig 30, the motor 20 is actuated and the cutting wheel 19 begins to revolve. The operator grasps the handle 25 on the arm 16 and moves the cutting wheel 19 against the link 45c. The operator continues to move the cutting wheel 19 downwardly within the receiving slot 34 until the link 45c has been severed. The set screws 52 are then removed and the cut portions of the chain 44 may be removed from the chain jig 30.

Another embodiment of a chain jig according to the instant invention is indicated in FIGS. 5 and 6 by the reference numeral 30a. In this embodiment, the chain jig 30a has a bottom portion 31a and upwardly extending end portions 32 and 33a which are similar to the corresponding elements in the embodiment shown in FIGS. 1 through 4. However, in this embodiment a chain link receiving recess 42a is located in a side surface of the end portion 32a rather than in the top surface. Similarly a chain link receiving recess 43a is located in a side surface of the end portion 33a. When the chain 44 is mounted in the chain jig 30a the link 45c, which is being cut, again extends across a receiving slot 34a. However, in this embodiment, both sides of the link 45c are severed at the same time while in the first embodiment (see FIG. 3) because the sides of the link 45c are spaced vertically from one another, the upper side is cut first. The cutting wheel 19 then moves downwardly and severs the bottom side of the link 45c.

While the present invention has been disclosed with a specific arrangement of parts, it should be expressly understood that numerous modifications and changes can be made without departing from the spirit and scope of the invention as defined in the appended claims.

What I claim is:

1. Apparatus for cutting a length of chain having a plurality of interconnected links, comprising, a base, an arm pivotally mounted on said base, a cutting wheel rotatably mounted on said arm, motor means for rotating said cutting wheel in a predetermined plane normal to the plane of said base, a chain jig positioned on said base adjacent said cutting wheel, and clamping means for securing said chain jig in a predetermined position on said base, said chain jig comprising a body having a bottom portion and opposed end portions extending upwardly from said bottom portion, said end portions being spaced apart and defining therebetween a receiving slot which extends transversely of said bottom portion in the predetermined plane of said cutting wheel, each of said end portions defining in its top surface at least one link receiving recess, whereby when the links of the chain are positioned in such link receiving recesses the link to be cut is held in a position normal to such predetermined plane.

2. Apparatus according to claim 1, including holding means for releasably retaining at least one link of the chain within one of such link receiving recesses.

3. A chain jig for use in a cut-off machine having clamp means for mounting said chain jig and a rotatable cutting wheel mounted in a predetermined plane, comprising, a body having a longitudinally extending bottom portion and opposed stationary end portions extending upwardly from said bottom portion, said end portions being spaced apart and defining therebetween a receiving slot which extends transversely of said bottom portion in the predetermined plane of such cutting wheel when said chain jig is mounted in such cut-off machine, each of said end portions defining in its top surface at least one link receiving recess which is longitudinally aligned with such link receiving recess in the other of said end portions, whereby the links of a chain, having a plurality of interconnected links are positioned in such link receiving recesses the link to be cut is held in a position normal to such predetermined plane.

4. A chain jig for use in a cut-off machine having clamp means for mounting said chain jig and a rotatable cutting wheel mounted in a predetermined plane, comprising, a body having a longitudinally extending rectangular bottom portion and opposed, integral end portions extending upwardly from said bottom portion, said end portions being spaced apart and defining therebetween a receiving slot which extends transversely of said bottom portion in the predetermined plane of such cutting wheel, said end portions each having an upper surface and opposed sidewalls, each of said end portions defining in said upper surface a link receiving recess which is longitudinally aligned with such link receiving recess in the other of said end portions, each of said end portions defining opposed link grooves longitudinally aligned with such link receiving recess, each of said link grooves communicating with such link receiving recess and extending outwardly through one of said opposed sidewalls.

5. A chain jig according to claim 4 and including holding means for releasably retaining a chain link within at least one of such link receiving recesses.

6. A chain jig for holding a portion of a chain, such chain having a predetermined bar diameter, comprising, a body having a longitudinally extending rectangular bottom portion and opposed stationary end portions extending upwardly from said bottom portion, said end portions being spaced apart and defining therebetween a cutting wheel receiving slot which extends transversely of said bottom portion, said end portions each having an upper surface and opposed sidewalls, each of said end portions defining in said upper surface a link receiving recess which is longitudinally aligned with such link receiving recess in the other of said end portions, each of said link receiving recesses extending downwardly from said upper surface a distance greater than one-half of such predetermined bar diameter, each of said end portions defining opposed link grooves longitudinally aligned with such link receiving recess, each of said link grooves communicating with such link receiving recess and extending outwardly through one of said opposed sidewalls.

References Cited

UNITED STATES PATENTS

| | | | |
|---|---|---|---|
| 2,570,302 | 10/1951 | Anderson | 51—238 X |
| 2,763,967 | 9/1956 | Hardy | 51—98 |
| 3,057,240 | 10/1962 | De Witt | 143—46 X |
| 3,205,621 | 9/1965 | Davis | 51—216 X |

LESTER M. SWINGLE, *Primary Examiner.*

D. G. KELLY, *Assistant Examiner.*

U.S. Cl. X.R.

51—99, 217